United States Patent
Sweeney et al.

(10) Patent No.: US 8,290,631 B2
(45) Date of Patent: Oct. 16, 2012

(54) METHODS AND APPARATUS TO ARBITRATE VALVE POSITION SENSOR REDUNDANCY

(75) Inventors: Thomas Sweeney, Verona, PA (US); Scott Shaw, Tequesta, FL (US); Peter Nicholas Francino, Renfrew, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 734 days.

(21) Appl. No.: 12/403,048

(22) Filed: Mar. 12, 2009

(65) Prior Publication Data
US 2010/0229975 A1   Sep. 16, 2010

(51) Int. Cl.
*G05D 7/00* (2006.01)
(52) U.S. Cl. ............. 700/282; 251/129.04; 251/30.01; 251/25; 91/361
(58) Field of Classification Search ............. 251/129.04, 251/30.01, 25; 137/487.5, 488; 700/282; 91/361
See application file for complete search history.

(56) References Cited

U.S. PATENT DOCUMENTS

| | | | | |
|---|---|---|---|---|
| 3,368,351 | A * | 2/1968 | Wood et al. ............... | 60/405 |
| 4,641,517 | A * | 2/1987 | Spock et al. ............... | 73/112.01 |
| 5,193,779 | A * | 3/1993 | Frey et al. ............... | 251/29 |
| 5,206,810 | A * | 4/1993 | Bools et al. ............... | 701/100 |
| 5,233,512 | A * | 8/1993 | Gutz et al. ............... | 700/30 |
| 5,247,964 | A * | 9/1993 | DeLange ............... | 137/599.05 |
| 5,353,685 | A * | 10/1994 | Snow ............... | 91/459 |
| 5,558,115 | A * | 9/1996 | Lenz et al. ............... | 137/86 |
| 6,129,332 | A * | 10/2000 | Dusterhoft ............... | 251/28 |
| 6,185,493 | B1 * | 2/2001 | Skinner et al. ............... | 701/50 |
| 6,272,401 | B1 * | 8/2001 | Boger et al. ............... | 700/282 |
| 6,512,960 | B1 * | 1/2003 | Schulz ............... | 700/56 |
| 6,745,084 | B2 * | 6/2004 | Boger et al. ............... | 700/13 |
| 6,966,285 | B1 * | 11/2005 | Sun ............... | 123/90.12 |
| 7,387,061 | B2 * | 6/2008 | Kobata et al. ............... | 91/405 |
| 7,862,003 | B2 * | 1/2011 | Karte et al. ............... | 251/129.04 |
| 7,970,583 | B2 * | 6/2011 | Novis et al. ............... | 702/183 |
| 2003/0020487 | A1 | 1/2003 | Down et al. | |
| 2003/0079603 | A1 * | 5/2003 | Schumacher et al. ............... | 91/361 |

(Continued)

FOREIGN PATENT DOCUMENTS

| | | |
|---|---|---|
| DE | 103 18 171 | 11/2004 |
| DE | 10318171 | 11/2004 |
| EP | 0 526 418 | 2/1993 |
| FR | 2 872 483 | 1/2006 |

OTHER PUBLICATIONS

Search Report, issued by the UK Patent Office on Jul. 29, 2010, in connection with Great Britain Application No. GB1004043.4, 3 pages. European Patent Office, Extended European Search Report, issued for European Patent Application Serial No. 10156262.7-1252, on Oct. 17, 2011, 8 pages.

*Primary Examiner* — John Rivell
*Assistant Examiner* — Minh Le
(74) *Attorney, Agent, or Firm* — Hanley, Flight & Zimmerman, LLC

(57) ABSTRACT

Example methods and apparatus to arbitrate valve position sensor redundancy are disclosed. A disclosed example method comprises measuring a first value representative of a position of a valve, measuring a second value representative of the position of the valve, computing a first estimated position of the valve, selecting one of the first and second values based on the first estimated position, and generating a first valve control signal for the valve based on the selected one of the first and second values.

24 Claims, 11 Drawing Sheets

U.S. PATENT DOCUMENTS

| | | | |
|---|---|---|---|
| 2004/0129317 A1* | 7/2004 | Bevan | 137/554 |
| 2005/0273204 A1* | 12/2005 | Hansen et al. | 700/282 |
| 2006/0191314 A1 | 8/2006 | Karte | |
| 2009/0133573 A1* | 5/2009 | Kleegrewe et al. | 91/361 |
| 2009/0194169 A1* | 8/2009 | Greeb | 137/85 |
| 2009/0222124 A1* | 9/2009 | Latwesen | 700/110 |
| 2010/0089067 A1* | 4/2010 | Wilkes et al. | 60/773 |

* cited by examiner

| ZT1 – ZT2 < T1 | ZTS – ZT1 > T2 | ZTS – ZT2 > T2 | SELECT | ALERT |
|---|---|---|---|---|
| 1 | X | X | ZT1 OR ZT2 | NONE |
| 1 | X | X | ZT1 OR ZT2 | NONE |
| 0 | 0 | 0 | ZT1 OR ZT2 | NONE |
| 0 | 1 | 1 | ZT1 | ZT2 FAILURE |
| 0 | 1 | 0 | ZT2 | ZT1 FAILURE |
| 0 | 1 | 1 | ZT1 | ZT1 & ZT2 FAILURE |

FIG. 5

_METHODS AND APPARATUS TO ARBITRATE VALVE POSITION SENSOR REDUNDANCY_

FIELD OF THE DISCLOSURE

This disclosure relates generally to valve position sensors and, more particularly, to methods and apparatus to arbitrate valve position sensor redundancy.

BACKGROUND

Some facilities and installations include redundancy to improve reliability and/or reduce outages. For instance, a valve may be provisioned or equipped with redundant position sensors. A valve positioner and/or controller associated with the valve can use the output(s) of any of the redundant position sensors to control the position of the valve. For example, were a primary position sensor to fail, the valve positioner could operate based on position information provided by a backup position sensor.

SUMMARY

Example methods and apparatus to arbitrate valve position sensor redundancy are disclosed. A disclosed example method includes measuring a first value representative of a position of a valve, measuring a second value representative of the position of the valve, computing a first estimated position of the valve, selecting one of the first and second values based on the first estimated position, and generating a first valve control signal for the valve based on the selected one of the first and second values.

A disclosed example apparatus includes a first sensor to measure a first value representative of a position of a valve actuator, a second sensor to measure a second value representative of the position of the valve actuator, a modeler to compute a third value representative of an estimated position of the valve actuator, an arbiter to select a one of the first and second values based on the computed third value, and a controller to generate a first valve control signal for the valve actuator based on the selected one of the first and second values.

Another disclosed example method includes measuring a first value representative of a movement of a valve, measuring a second value representative of the movement of the valve, computing an estimated behavior of the valve, selecting one of the first and second values based on the estimated behavior, and generating a first valve control signal for the valve based on the selected one of the first and second values.

BRIEF DESCRIPTION OF THE DRAWINGS

FIG. 5 illustrates a table representative of example decision logic that may be carried out to implement the example selector of FIG. 4.

DETAILED DESCRIPTION

Figure 1:
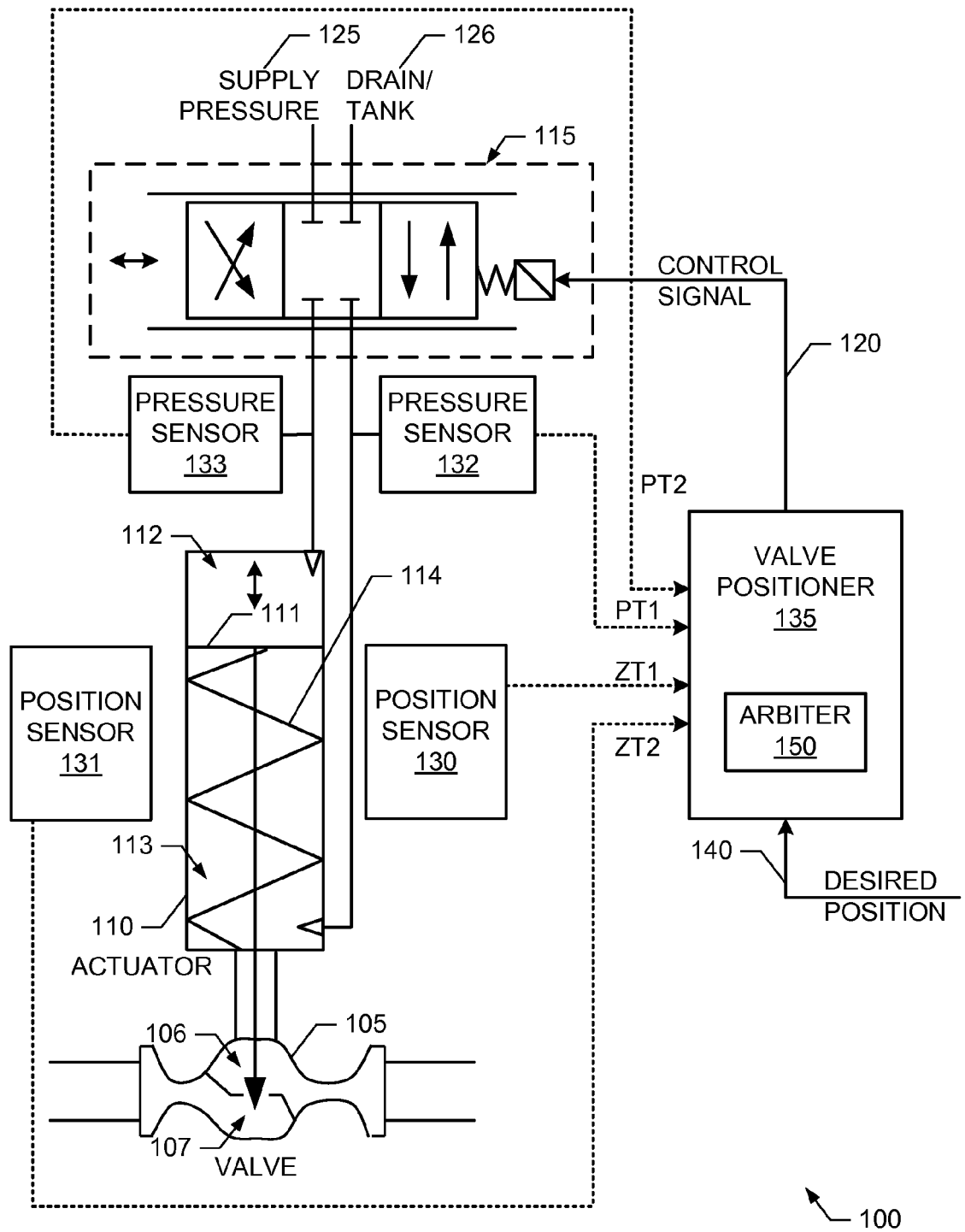
FIG. 1 is a schematic illustration of an example valve control apparatus.

The present disclosure is best understood from the following detailed description when read with the accompanying figures. In describing these examples, like or identical reference numbers may be used to identify common or similar elements. It is emphasized that, in accordance with standard practice, various features in the accompanying figures may not be drawn to scale. In fact, the dimensions of the various features may be arbitrarily reduced and/or exaggerated in scale or in schematic for clarity of discussion and/or illustration. Moreover, while certain embodiments are disclosed herein, other embodiments may be utilized and structural changes may be made without departing from the scope of this disclosure.

In general, the example apparatus, methods, and articles of manufacture described herein may be used to arbitrate valve position sensor redundancy. When there are multiple and/or redundant valve position sensors available to measure the position of a valve and/or valve actuator, the valve positioner associated with the valve and/or valve actuator arbitrates between, that is, selects the output(s) of one of the valve position sensors to be used in generating valve control signals. When there are three or more position sensors, the valve positioner can, for example, compare the outputs of the position sensors to identify a faulty and/or failed position sensor. For example, when a position measured by a particular position sensor differs from that measured by other position sensors, such a difference is typically indicative that the particular position sensor is not operating as intended. However, when there are only two position sensors, such comparisons cannot as readily be used to arbitrate between the valve position sensors, as it may be difficult to determine which sensor is operating as intended. The example methods and apparatus disclosed herein estimate the position of the valve and/or valve actuator, and use the estimated position to arbitrate between outputs of the two position sensors. Thus, the example methods and apparatus described herein simulate an additional "virtual" position sensor that is used to perform valve position sensor arbitration. For example, if the estimated position corresponds to the position measured by a first position sensor but not to the position measured by a second position sensor, it is likely that the second position sensor is not operating as intended.

As described herein, the estimated and/or computed position may be determined using any number and/or type(s) of algorithm(s), logic and/or method(s). For example, a model that represents the position of the valve and/or valve actuator as a function of, for example, a previous position, a starting position, an ending position, a control signal value, and/or a time, can be used to estimate the position and/or change in position of the valve and/or valve actuator. Additionally or alternatively, pressures associated with opposite sides of a valve actuator piston may be used to estimate and/or compute the position of the valve and/or valve actuator.

FIG. 1 illustrates an example valve control apparatus 100 constructed in accordance with the teachings of this disclosure. The example valve control apparatus 100 of FIG. 1 controls the opening and closing of a valve 105 by controlling and/or adjusting the position of a valve actuator 110. The example valve actuator 110 of FIG. 1 includes a piston 111 that forms in the actuator 110 two fluidly isolated chambers 112 and 113. By controlling, selecting and/or otherwise adjusting respective pressures in the two chambers 112 and 113 relative to a force exerted by a spring 114, the piston 111 can be moved up, be moved down (in the orientation of FIG. 1) and/or be held stationary within the illustrated actuator 110. As the piston 111 moves up and down, the rate at which any fluid (e.g., liquid and/or gas) can flow between two chambers 106 and 107 of the valve 105 can be regulated and/or adjusted. For example, when the example piston 111 is in a fully downward position, the example valve 105 is in a "closed" state and no fluid can flow through the valve 105. While the example valve 105 of FIG. 1 is a sliding-stem valve operated by a direct-acting actuator 110, the methods and apparatus described herein to arbitrate valve position sensor redundancy is applicable to any number and/or type(s) of additional and/or alternative valves and/or valve actuators. For example, a double rod end valve actuator could be used.

To control the respective pressures in the chambers 112 and 113, the example valve control apparatus 100 of FIG. 1 includes a servo valve 115. In response to a control signal 120, the example servo valve 115 of FIG. 1 operates to selectively couple the chambers 112 and 113 to a supply pressure 125 and a drain and/or tank 126. In a first position, the servo valve 115 fluidly couples the chamber 112 to the supply 125, and the chamber 113 to the drain 126, thereby increasing the pressure in the chamber 112 relative to the chamber 113 and moving the piston 111 toward the valve 105 of downward in the orientation of FIG. 1. Likewise, in a second position, the servo valve 115 fluidly couples the chamber 112 to the drain 126, and the chamber 113 to the supply 125, thereby increasing the pressure in the chamber 113 relative to the chamber 112 and moving the piston 111 away from the valve 105 or upward in the orientation of FIG. 1. Additionally or alternatively, the example servo valve 115 and the example actuator 110 may be configured to fluidly couple fluid removed from one of the chambers 112, 113 into the other chamber 112, 113 using, for example, a hydraulic recirculation configuration. The fluid(s) used to operate the example actuator 110 may be any type of fluid including any type of gas (i.e., a pneumatic actuator 110) and/or any type of liquid (i.e., a hydraulic actuator 110). While the example servo valve 115 is used in the illustrated example of FIG. 1 to control the example actuator 110, any number and/or type(s) of additional and/or alternative method(s) and/or device(s) may be used to control the actuator 110. For example, the valve 115 may be a proportional valve configured to control variable flow to and/or from either chamber 112, 113 of the actuator 110. Moreover, while the example valve 115 of FIG. 1 is depicted as a three-position device, in practice, the valve 115 is a variable fluid flow rate control device.

The example control signal 120 of FIG. 1 is an electrical signal having a variable current. However, any other type of control signals 120 could be used. For example, an electrical signal having a variable voltage and/or variable frequency could be used.

To measure the position of the example piston 111 within the example actuator 110 and, thus, the position of the example valve 105, the example valve control apparatus 100 of FIG. 1 includes any number and/or type(s) of valve position sensors, two of which are designated at reference numerals 130 and 131. Example valve position sensors 130 and 131 include, but are not limited to, linear variable displacement transducers (LVDTs) that generate a variable output voltage and/or variable output current based on the position of the piston 111. The example position sensors 130 and 131 of FIG. 1 independently measure the position of the piston 111. That is, the example position sensors 130 and 131 may have different output signals, ZT1 and ZT2, respectively, at substantially the same instant. For example, were the position sensor 130 to not operate as intended, the output ZT2 of the position sensor 131 can continue to represent the position of the piston 111 even though the output ZT1 of the position sensor 130 no longer accurately represents the position of the piston 111. Even when operating as intended, it will be understood that the accuracy of the position outputs ZT1 and ZT2 measured by the sensors 130 and 131, respectively, may be limited and/or reduced by any number of factors, such as mechanical limitations, mechanical misalignment, analog-to-digital conversion quantization, noise, etc. However, for ease of discussion, it will be assumed herein that such factors are negligible and/or can be compensated and, thus, a sensor 130, 131 that is operating as intended will have an output ZT1, ZT2 that substantially represents the actual physical position of the piston 111.

To measure the fluid (e.g., liquid and/or gas) pressures in the chambers 112 and 113, the example valve control apparatus 100 of FIG. 1 includes any number and/or type(s) of pressure sensors, two of which are designated at reference numerals 132 and 133. The example pressure sensors 132 and 133 generate respective outputs PT1 and PT2, which represent the pressures in respective ones of the chambers 112 and 113. The example outputs PT1 and PT2 of FIG. 1 can be any number and/or type(s) of signals, such as, a variable current signal, a variable voltage signal and/or a variable frequency signal that may be used to represent a measured pressure.

To control the position of the valve 105 (e.g., open, closed and/or partially open), the example valve control apparatus 100 of FIG. 1 includes a valve positioner 135. In response to a value, current, voltage and/or frequency 140 representative of a desired position for the valve 105, the example valve positioner 135 of FIG. 1 adjusts, selects, controls, and/or otherwise adapts the control signal 120. In addition to the desired position 140, the example valve positioner 135 uses the pressure measurements PT1 and PT2, and/or the position measurements ZT1 and ZT2 to adapt the control signal 120. An example manner of implementing the example valve positioner 135 is described below in connection with FIG. 2.

It should be understood that the example pressure measurements PT1 and PT2, the example position measurements ZT1 and ZT1, the example desired position 140 and/or the example control signal 120 could be represented by analog and/or digital signals and/or values. For example, the position sensors 130 and 131 may each implement an analog-to-digital converter with the position measurements ZT1 and ZT2 being digital signals. Additionally or alternatively, the example valve positioner 135 may implement one or more analog-to-digital converters with the position measurements ZT1 and ZT2 being received at the valve positioner 135 as analog signals. Accordingly, the measurements PT1, PT2, ZT1 and ZT2, and the desired position 140 are simply referred to herein as measurements and/or values without regard to whether they are analog and/or digital. It is assumed that if such measurements and/or values are to be processed by a digital circuit and/or a digital processor that they can be converted anywhere within the example valve control apparatus 100 to digital signals, as necessary.

To arbitrate between the valve position sensors 130 and 131, that is, to select whether the output ZT1 or the output ZT2 will be used by the valve positioner 135 when adapting the control signal 120, the example valve positioner 135 of FIG. 1 includes an arbiter 150. An example manner of implementing the example arbiter 150 of FIG. 1 is described below in connection with FIG. 4.

While the example valve control apparatus 100 has been illustrated in FIG. 1, one or more of the interfaces, elements, processes and/or devices illustrated in FIG. 1 may be combined, divided, re-arranged, omitted, eliminated and/or implemented in any other way. For example, the pressure sensors 133 and 132 may be omitted if not used by the valve positioner 135. Further, the valve control apparatus 100 may include interfaces, elements, processes and/or devices instead of, or in addition to, those illustrated in FIG. 1 and/or may include more than one of any or all of the illustrated interfaces, elements, processes and/or devices.

Figure 2:
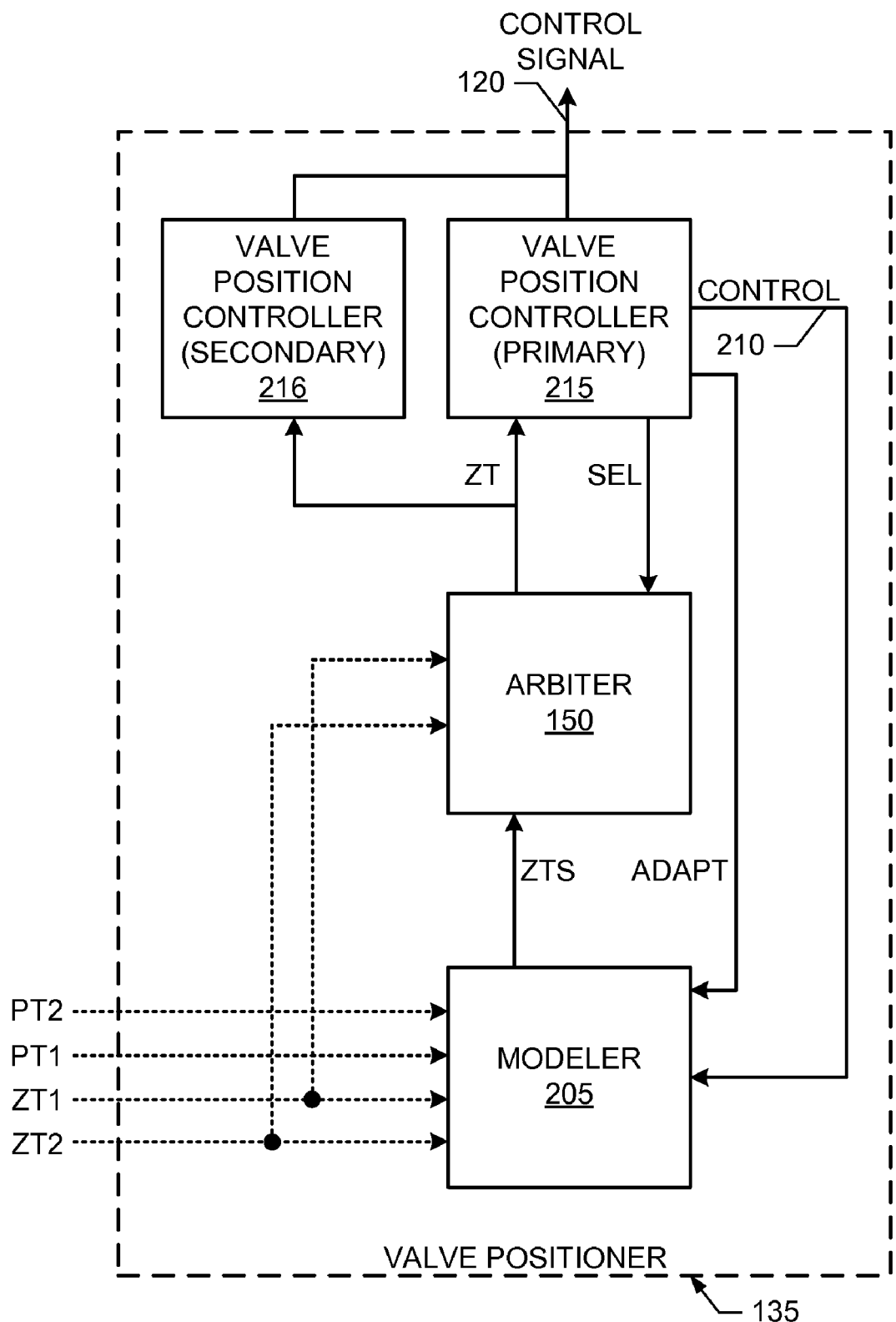
FIG. 2 illustrates an example manner of implementing the example valve positioner of FIG. 1.

FIG. 2 illustrates an example manner of implementing the example valve positioner 135 of FIG. 1. To compute a value ZTS representative of an estimated position, and/or an estimated and/or expected behavior of the example valve actuator 110, the example valve positioner 135 of FIG. 2 includes a modeler 205. In some examples, the example modeler 205 of FIG. 2 computes the estimated position ZTS based on one or more control signal(s) 210 received from a controller 215. The estimated position ZTS may be computed from the control signal(s) using a model and/or filter 305 (FIG. 3) that represents the collective behavior of the example servo valve 115 and the example valve actuator 110 in response to the control signal 120. The example control signal 210 of FIG. 2 is a digital signal that substantially represents and/or corresponds to the control signal 120. Additionally or alternatively, the example modeler 205 may compute and/or select the value ZTS to represent an expected behavior of the valve actuator 110. For example, the modeler 205 can compute and/or select the ZTS value to have any positive number (e.g., positive one) to represent that the valve 105 is opening, to have any negative number (e.g., negative one) to represent that the valve 105 is closing, or to have a value of zero to represent that the valve 105 neither opening nor closing (i.e., stationary). For example, the value of ZTS may be computed by computing a fast moving average of the control signal 210 and a slow moving average of the control signal 210. If the fast moving average exceeds the slow moving average by, for example, 3%, and both averages have the same sign, then the valve 105 is currently being opened and/or closed, and the value of ZTS is any number (e.g., one) having the same sign as the fast moving average. When the control signal 210 does not represent a moving valve 105, the value of ZTS is set to zero. The moving averages can be computed using an exponential smoothing function, which can be expressed mathematically as $p(t)=k*control(t)+(1-k)*p(t-1)$, where sample (t) is the most recent value of the control signal 210, and k is a constant between zero and one. An example value of k for a fast moving average is $1/32$, and an example value of k for a slow moving average is $1/64$.

Additionally or alternatively, the ZTS value representing an expected behavior of the valve 105 may be determined, selected and/or computed based on two or more values of the control signal 210. For example, a difference between two samples of the control signal 210, and/or an estimate of the derivative of the control signal 210 computed using two or more samples of the control signal may be used to select the value of ZTS. Further still, samples of the control signal 210 may be used to compute two or more estimated positions of the valve 105. Differences and/or derivatives of such estimated position values may be computed to determine and/or select the value of ZTS.

As described below in connection with FIG. 3, the model/filter 305 may be adaptive and/or may learn how the servo valve 115 and the valve actuator 110 behave in the response to the control signal 120 by, for example, comparing the computed estimated position ZTS with one or both of the measured positions ZT1 and ZT2. Whether the example modeler 205 adapts its model/filter 305 is controlled and/or configured by a control value ADAPT. For example, during a calibration phase of the example valve control apparatus 100, the control value ADAPT may be set so that the modeler 205 can learn the behavior of the valve control apparatus 100 in response to the control signal 120. At the end of the calibration phase, the control value ADAPT may be cleared to "freeze" the coefficients of the modeler 205. The control value ADAPT may also be set after, for example, a valve replacement, a valve rebuild and/or a controller tuning. An example manner of implementing the example modeler 205 is described below in connection with FIG. 3. Example processes that may be carried out to implement the example modeler 205 are described below in connection with FIGS. 6 and 7.

Additionally or alternatively, the example modeler 205 of FIG. 2 may compute the estimated position and/or estimated behavior ZTS based on the measured pressures PT1 and PT2, and time. For example, the modeler 205 may compute the estimated position ZTS based on the measured pressures PT1 and PT2 and time using a mathematical expression that represents the position of the actuator 110 as a function of the pressures PT1 and PT2 and time. Moreover, the example modeler 205 of FIG. 2 may compute the estimated position and/or estimated behavior ZTS based on any combination(s) of time, the control signal 210 and the measured pressures PT1 and PT2.

To arbitrate between the example valve position sensors 130 and 131, the example valve positioner 135 of FIG. 2 includes the example arbiter 150. The example arbiter 150 of FIG. 2 selects one of the measured positions ZT1 and ZT2 based on comparisons of the estimated positions ZTS to the measured positions ZT1 and ZT2, and/or a comparison between the measured positions ZT1 and ZT2. As described below in connection with FIGS. 4 and 5, the example arbiter 150 computes differences between pairs of the positions ZTS, ZT1 and ZT2, and uses the computed differences to select one of the measured positions ZT1 and ZT2. The selected position ZT is provided to one or more controllers, two of which are designated at reference numerals 215 and 216. In the illustrated example of FIG. 2, the controller 215 can provide a signal SEL that directs the arbiter 150 to select a particular one of ZT1 or ZT2 rather than arbitrating between ZT1 and ZT2 based on ZTS. Example processes that may be carried out to implement the example arbiter 150 are described below in connection with FIGS. 8, 9 and 10.

Additionally or alternatively, the example arbiter 150 may compare a change between two computed estimated positions ZTS to a change between two corresponding measured positions ZT1 and to a change between two corresponding measured positions ZT2. When a particular valve position sensor 130, 131 is operating as intended, the change in its measured position ZT1, ZT2 will substantially match and/or correspond to the change in the estimated position ZTS. Such changes may occur and/or be detected during normal operation of the example valve control apparatus 100 of FIG. 1 (e.g., while opening and/or closing the valve 105), and/or in response to a momentary and intentional perturbation of the valve actuator 110 by the valve position controller 215 to test the position sensors 130 and 131.

Further still, rather than computing actual estimated position values, ZTS can be computed to represent whether the actuator 110 is moving and, if moving, in which direction the actuator 110 is moving. In particular, ZTS can be determined by computing a fast moving average, a slow moving average, a difference and/or a derivative of the control signal 210, as described above. It will be appreciated that such ZTS values may be less complex to compute as compared to the computation of actual estimated positions. To determine whether measured positions ZT1 represent whether the valve 105 is opening or closing, a fast and a slow moving average of the measured positions ZT1 may be computed, as described above. If the fast moving average of ZT1 exceeds the slow moving average of ZT1 by, for example, 1.5%, and the sign of the fast and slow moving averages have the same sign, then the measured positions ZT1 represent that the valve 105 is being opened or closed. If the measured positions ZT1 represent a moving actuator 110 and the sign of the fast moving average of ZT1 matches the sign of ZTS, then it is likely that the position sensor 130 is operating as intended. Likewise if the measured positions ZT1 represent a non-moving actuator 110 and ZTS is zero, then the position sensor 130 is also likely operating as intended. In contrast, if ZTS is zero and the measured positions ZT1 represent a moving actuator 110, or the sign of the ZTS and the sign of the fast moving average of ZT1 are different, then it is likely that the position sensor ZT1 is not operating as intended. Additionally or alternatively, rather than computing moving averages, differences between measured positions ZT1 can be computed. Whether the position sensor 131 is operating as intended can likewise be determined from the measured positions ZT2 using differences and/or moving averages. In some example, the controller 215 momentary and/or intentionally perturbs the valve actuator 110 to facilitate testing of the position sensors 130 and 131, as described above.

Additionally or alternatively, the change between two measured positions ZT1, ZT2 can be compared with the value of ZTS. For example, if the value of ZTS represents that the valve 105 is currently opening, but the difference between two measured positions ZT1, ZT2 indicates that the actuator 110 has not changed position and/or is closing, it is likely that the corresponding position sensor 130, 131 is not operating as intended. Moreover, if the value of ZTS represents that the valve 105 is currently stationary but the value of ZT1, ZT2 is changing smoothly and/or abruptly, it is likely that the corresponding position sensor 130, 131 is not operating as intended. Moreover, a derivative of the measured positions ZT1, ZT2 may be computed and compared with the value of ZTS to determine whether a corresponding position sensor 130, 131 is operating as intended.

To control the example servo-valve 115 via the example control signal 120, the example valve positioner 135 includes the example valve position controllers 215 and 216. The example valve position controllers 215 and 216 of FIG. 2 are any type(s) of controllers that generate the valve control signal 120 based on the selected position ZT. While in the illustrated example of FIG. 2, there are two valve position controllers 215 and 216 for redundancy; the example valve positioner 135 may alternatively implement a single valve position controller 215 and/or more than two valve position controllers.

While an example manner of implementing the example valve positioner 135 of FIG. 1 has been illustrated in FIG. 2, one or more of the interfaces, elements, processes and/or devices illustrated in FIG. 2 may be combined, divided, rearranged, omitted, eliminated and/or implemented in any other way. For example, the example modeler 205, the example arbiter 150 and the example valve position controller 215 may be implemented using a processor platform, such as the example processor platform P100 described below in connection with FIG. 11. Further, the example modeler 205, the example arbiter 150, the example valve position controllers 215 and 216 and/or, more generally, the example valve positioner 135 of FIG. 2 may be implemented by hardware, software, firmware and/or any combination of hardware, software and/or firmware. Thus, for example, any of the example modeler 205, the example arbiter 150, the example valve position controllers 215 and 216 and/or, more generally, the example valve positioner 135 may be implemented by one or more circuit(s), programmable processor(s), application specific integrated circuit(s) (ASIC(s)), programmable logic device(s) (PLD(s)), field programmable logic device(s) (FPLD(s)), field-programmable gate array(s) (FPGA(s)), etc. Further still, the valve positioner 135 may include interfaces, data structures, elements, processes and/or devices instead of, or in addition to, those illustrated in FIG. 2 and/or may include more than one of any or all of the illustrated interfaces, data structures, elements, processes and/or devices.

Figure 3:
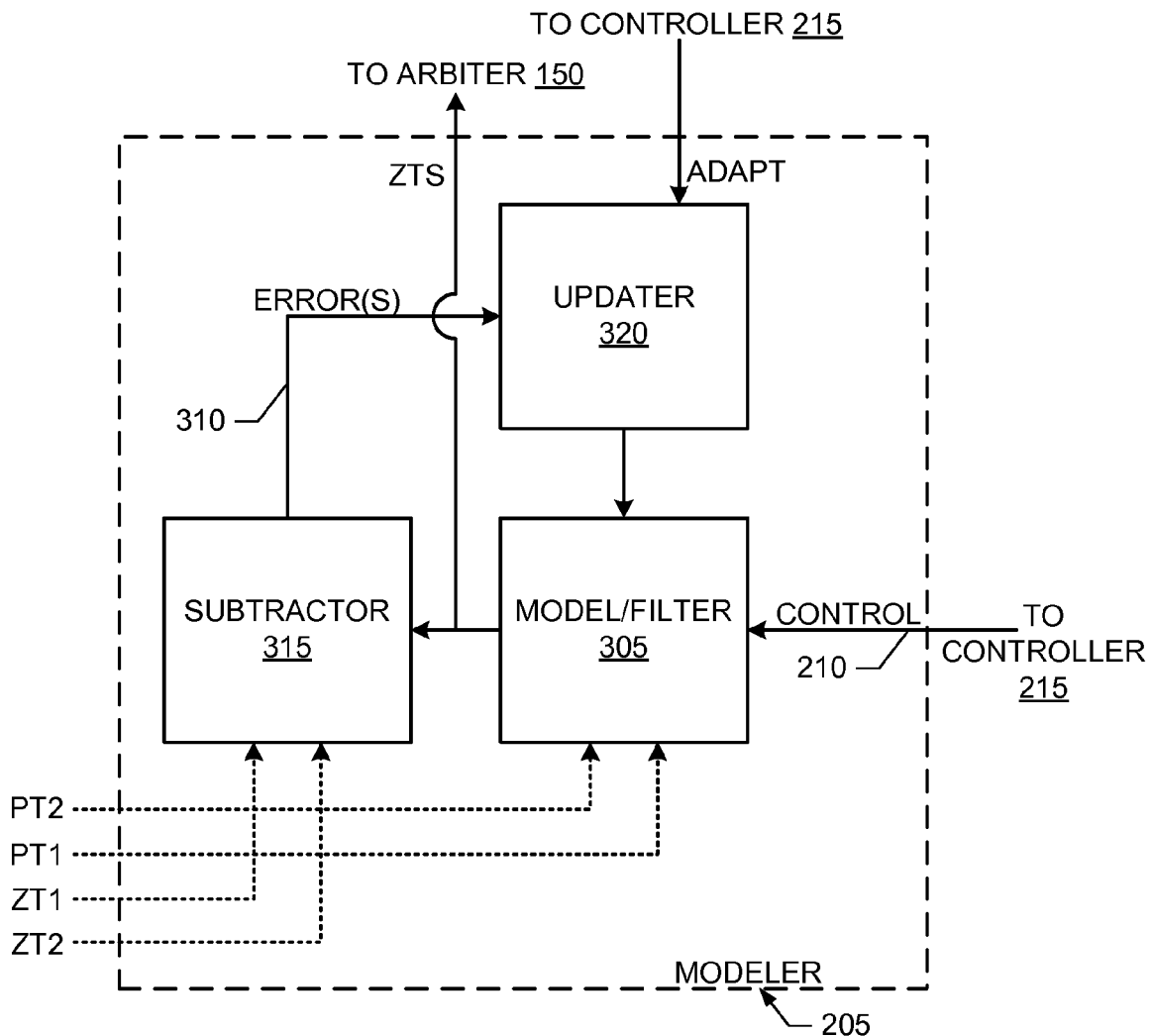
FIG. 3 illustrates an example manner of implementing the example modeler of FIG. 2.

FIG. 3 illustrates an example manner of implementing the example modeler 205 of FIG. 2. To compute an estimated position ZTS of the example valve actuator 110 and/or the example valve 105, the example modeler 205 of FIG. 3 includes the example model and/or filter model 305. The example model/filter 305 of FIG. 3 implements a "soft" or virtual position sensor. The example model/filter 305 computes the estimated position, and/or estimated and/or expected behavior ZTS based on time, the control signal 210 and/or the pressure measurements PT1 and PT2. For example, the model/filter 305 computes the estimated position and/or ZTS as a function of one or more previously estimated positions ZTS of the actuator 110 and/or the valve 105, the control signal 210, and/or time. The example model 305 of FIG. 3 may be implemented, for example, using a filter having a state representing previously estimated positions ZTS, inputs including time and the control signal 210, and filter coefficients that compute the estimated position ZTS based on the state and inputs. Additionally or alternatively, the example modeler 205 may compute and/or select the value ZTS to represent an expected behavior of the valve actuator 110. For example, the modeler 205 can compute and/or select the ZTS value to have any positive number (e.g., positive one) to represent that the valve 105 is opening, to have any negative number (e.g., negative one) to represent that the valve 105 is closing, or to have a value of zero to represent that the valve 105 neither opening nor closing (i.e., stationary). As described below, the filter coefficients may be adapted based on the measured positions ZT1 and ZT2 to adapt and/or learn, over time, filter coefficients that more accurately represent the collective behavior of the servo valve 115 and the valve actuator 110 in response to the control signal 120.

Additionally or alternatively, the example model/filter 305 of FIG. 3 may compute the estimated position and/or estimated behavior ZTS based on the measured pressures PT1 and PT2, and time. For example, the model/filter 305 may compute the estimated position ZTS based on measured pressures PT1 and PT2, and time using a mathematical expression that represents the position of the actuator 110 as a function of the pressures PT1 and PT2. Moreover, the example model/filter 305 may compute the estimated position and/or estimated behavior ZTS based on any combination(s) of the control signal 210 and the measured pressures PT1 and PT2, and time. The coefficients and/or variables of such models may likewise be learned and/or adapted over time.

To compute error values 310, the example modeler 205 of FIG. 3 includes a subtractor 315. The example subtractor 315 of FIG. 3 computes differences 310 between the estimated position ZTS and either or both of the measured positions ZT1 and ZT2. The computed differences 310 represent how closely the model/filter 305 represents the behavior of the servo valve 115 and the valve actuator 110.

To update the model/filter 305, the example modeler 205 of FIG. 3 includes an updater 320. When enabled by the signal ADAPT and based on the computed error(s) 310, the example updater 320 of FIG. 3 updates and/or adapts the coefficients and/or variables of the model/filter 305. For example, the updater 320 can update the coefficients and/or variables of the model/filter 305 using least mean squares (LMS) adaptation. In some examples, the updater 320 disables and/or discontinues updates of the model/filter 305 once the model/filter 305 has converged to, for example, reduce computational complexity of the modeler 205. For example, when the root mean square (RMS) value of the errors 310 falls below a threshold, updates of the model/filter 305 could be discontinued even when the control signal ADAPT indicates that updates may be performed. Updates of the model/filter 305 could resume when the RMS value of the errors 310 exceeds the threshold and the control signal ADAPT indicates that adaptation is enabled.

While an example manner of implementing the example modeler 205 of FIG. 2 has been illustrated in FIG. 3, one or more of the interfaces, elements, processes and/or devices illustrated in FIG. 3 may be combined, divided, re-arranged, omitted, eliminated and/or implemented in any other way. Further, the example model/filter 305, the example subtractor 315, the example updater 320 and/or, more generally, the example modeler 205 of FIG. 3 may be implemented by hardware, software, firmware and/or any combination of hardware, software and/or firmware. Thus, for example, any of the example model/filter 305, the example subtractor 315, the example updater 320 and/or, more generally, the example modeler 205 may be implemented by one or more circuit(s), programmable processor(s), ASIC(s), PLD(s), FPLD(s), FPGA(s), etc. Further still, the modeler 205 may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
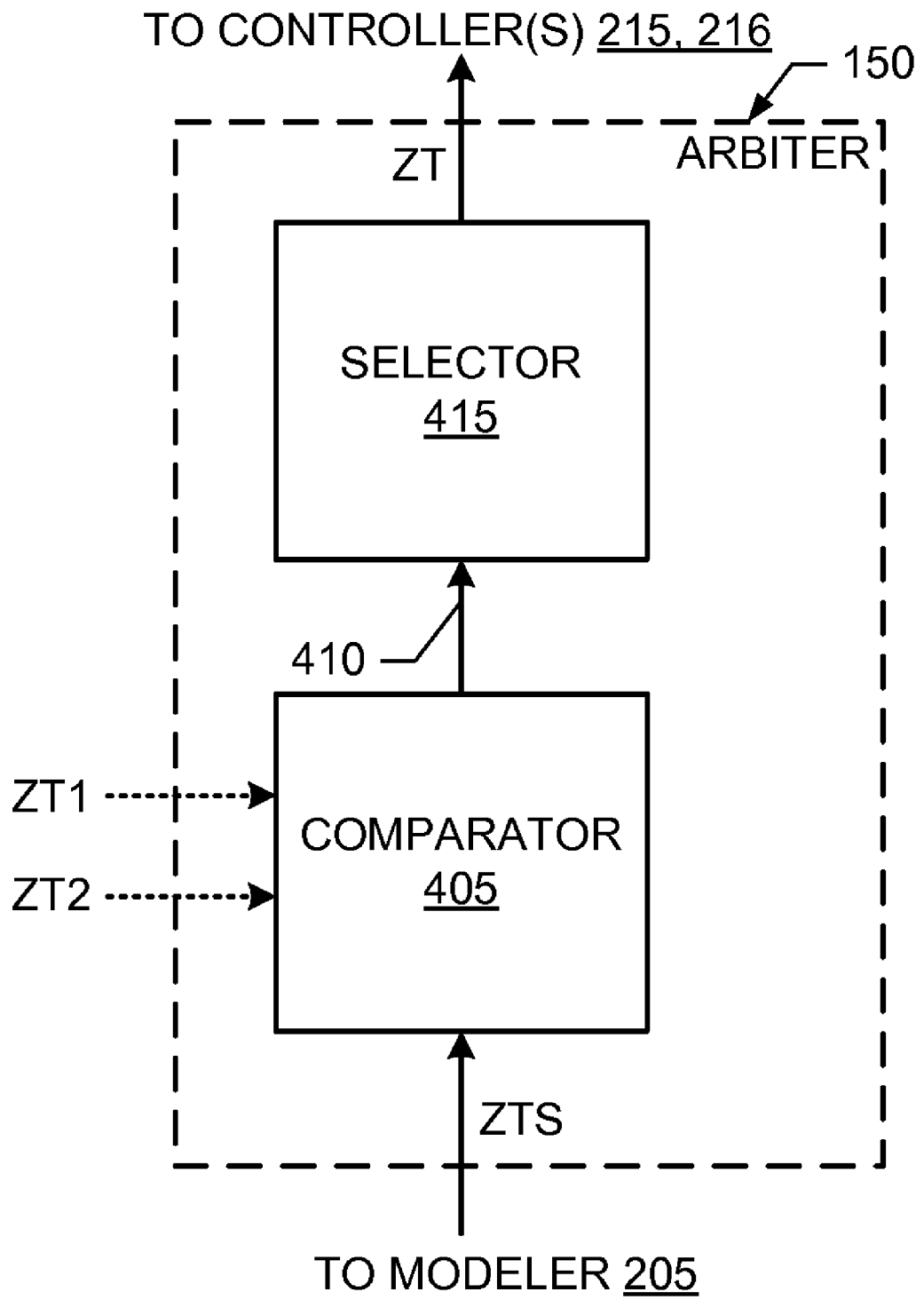
FIG. 4 illustrates an example manner of implementing the example arbiter of FIG. 2.

FIG. 4 illustrates an example manner of implementing the example arbiter 150 of FIGS. 1 and 2. To compare estimated positions ZTS and measured positions ZT1 and ZT2, the example arbiter 150 of FIG. 4 includes a comparator 405. The example comparator 405 of FIG. 4 computes a first difference 410 between ZT1 and ZT2, a second difference 410 between ZT1 and ZTS and a third difference 410 between ZT2 and ZTS. Additionally or alternatively, the example comparator 405 may compute differences 410 between pairs of ZT1 values, between pairs of ZT2 values, and/or between pairs of ZTS values, as described below in connection with the example process of FIG. 9, and/or compute and compare moving averages and/or derivatives as described above in connection with FIG. 2 and/or below in connection with the example process of FIG. 10.

To select one of the measured positions ZT1 and ZT2, the example arbiter 150 of FIG. 4 includes a selector 415. Based on the differences 410 computed by the comparator 405, the example selector 415 of FIG. 4 selects as the position ZT one of the measured positions ZT1 and ZT2, and determines whether an alert indicating that one of the positions sensors 130 and 131 may be faulty should be issued. Example decision logic that may be carried out by the example selector 415 to select between the measured positions ZT1 and ZT2 is described below in connection with FIG. 5.

While an example manner of implementing the example arbiter 150 of FIGS. 1 and 2 has been illustrated in FIG. 4, one or more of the interfaces, elements, processes and/or devices illustrated in FIG. 4 may be combined, divided, re-arranged, omitted, eliminated and/or implemented in any other way. Further, the example comparator 405, the example selector 415 and/or, more generally, the example arbiter 150 of FIG. 4 may be implemented by hardware, software, firmware and/or any combination of hardware, software and/or firmware. Thus, for example, any of the example comparator 405, the example selector 415 and/or, more generally, the example arbiter 150 may be implemented by one or more circuit(s), programmable processor(s), ASIC(s), PLD(s), FPLD(s), FPGA(s), etc. Further still, the arbiter 150 may include interfaces, data structures, elements, processes and/or devices instead of, or in addition to, those illustrated in FIG. 4 and/or may include more than one of any or all of the illustrated interfaces, data structures, elements, processes and/or devices.

FIG. 5 illustrates a table representative of example decision logic that may be used to implement the example selector 415 of FIG. 4. The example table of FIG. 5 contains a plurality of entries 505 for respective ones of a plurality of states 510. For example, an entry 515 corresponds to a state 510 where the difference between ZT1 and ZT2 are less than a threshold T1. If the threshold T1 has a small value, the entry 515 corresponds to a state 510 where the position sensors 130 and 131 have outputs ZT1 and ZT2, respectively, that substantially represent the actual position of the actuator 110. In such a state 510, the selector 415 can select either ZT1 or ZT2 (e.g., can select ZT1 by default), and where no alert is needed. In contrast, another example entry 520 corresponds to a state 510 where there is a substantive difference between ZT1 and ZT2, and there is a substantive difference between ZT1 and ZTS. In such a state 510, the selector 415 selects ZT2, and issues an alert for a failing and/or failed position sensor 130 corresponding to ZT1.

Figure 6:
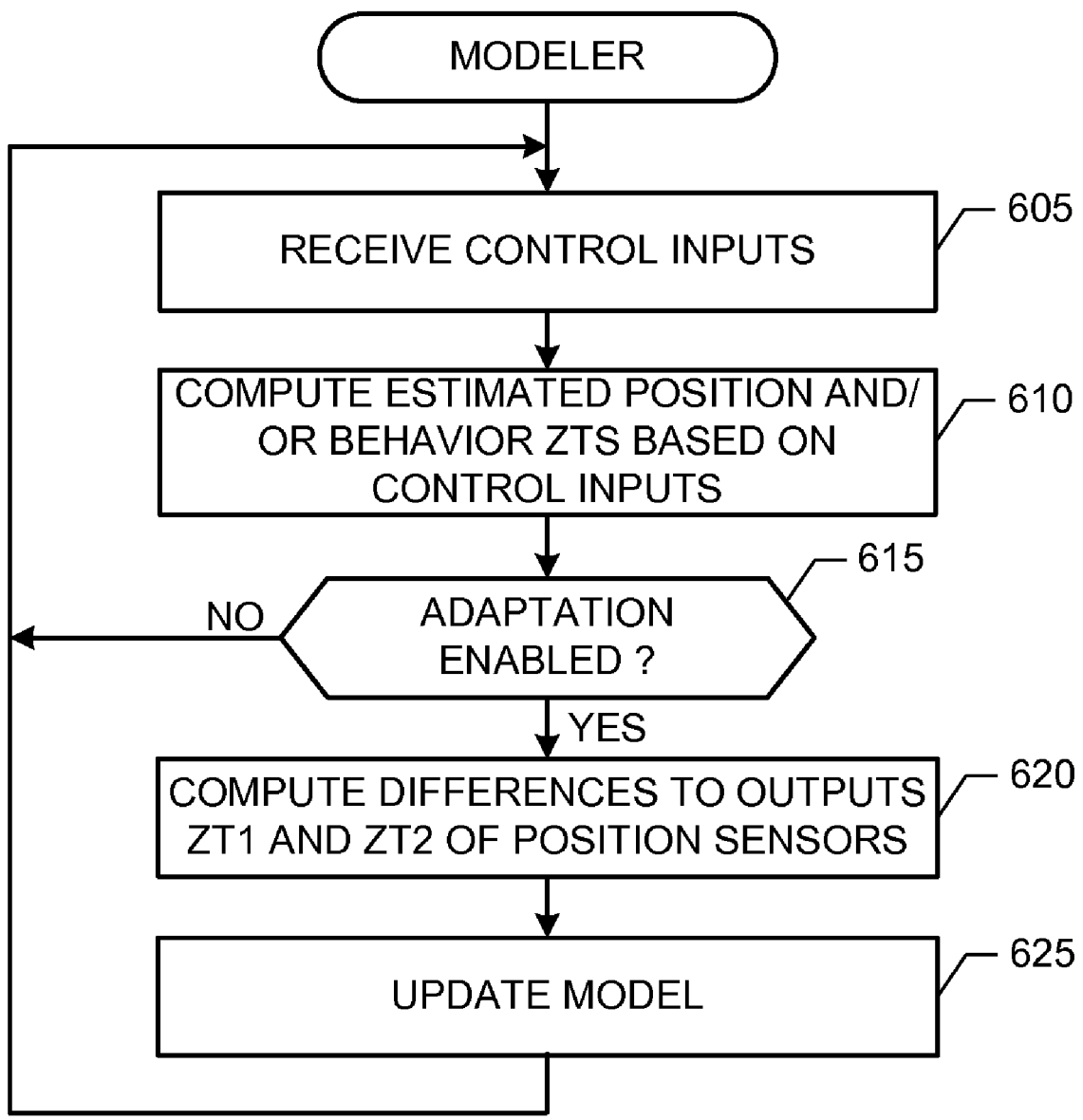
FIGS. 6 and 7 are flowcharts representative of example processes that may be used to implement the example modelers of FIGS. 2 and 3.
Figure 7:
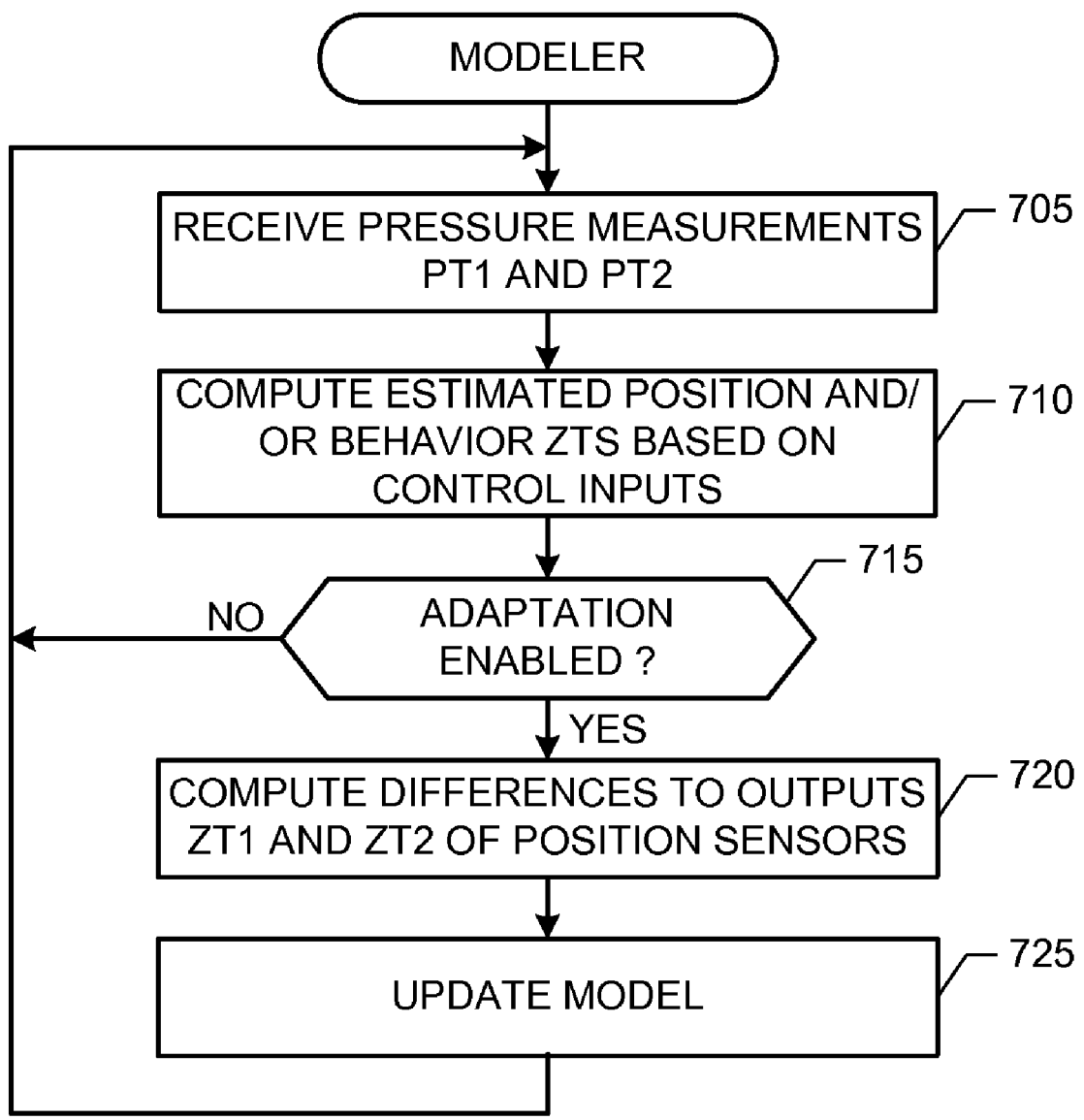
Figure 8:
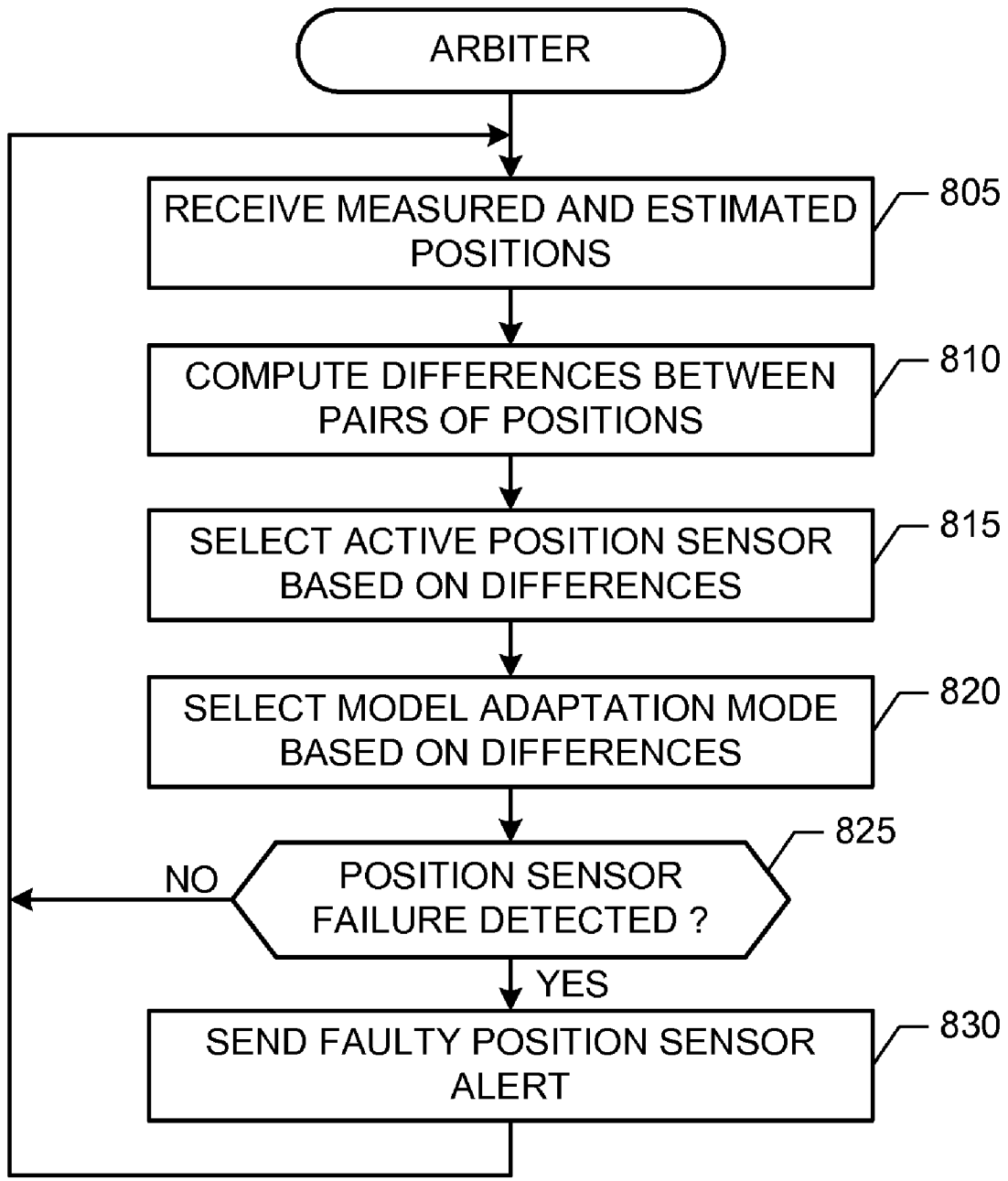
FIGS. 8, 9 and 10 are flowcharts representative of example processes that may be used to implement the example arbiters of FIGS. 1, 2 and 4.
Figure 9:
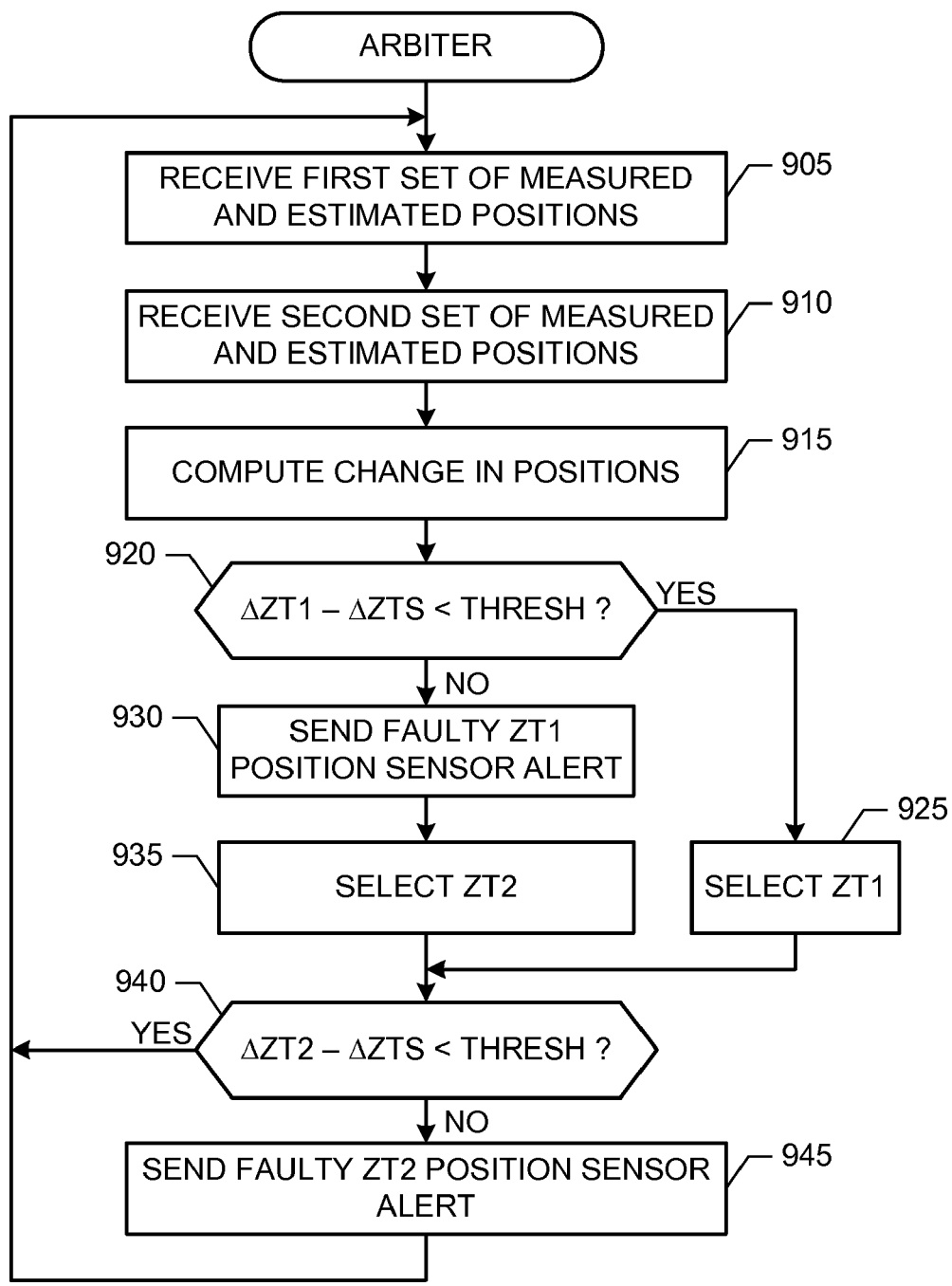
Figure 10:
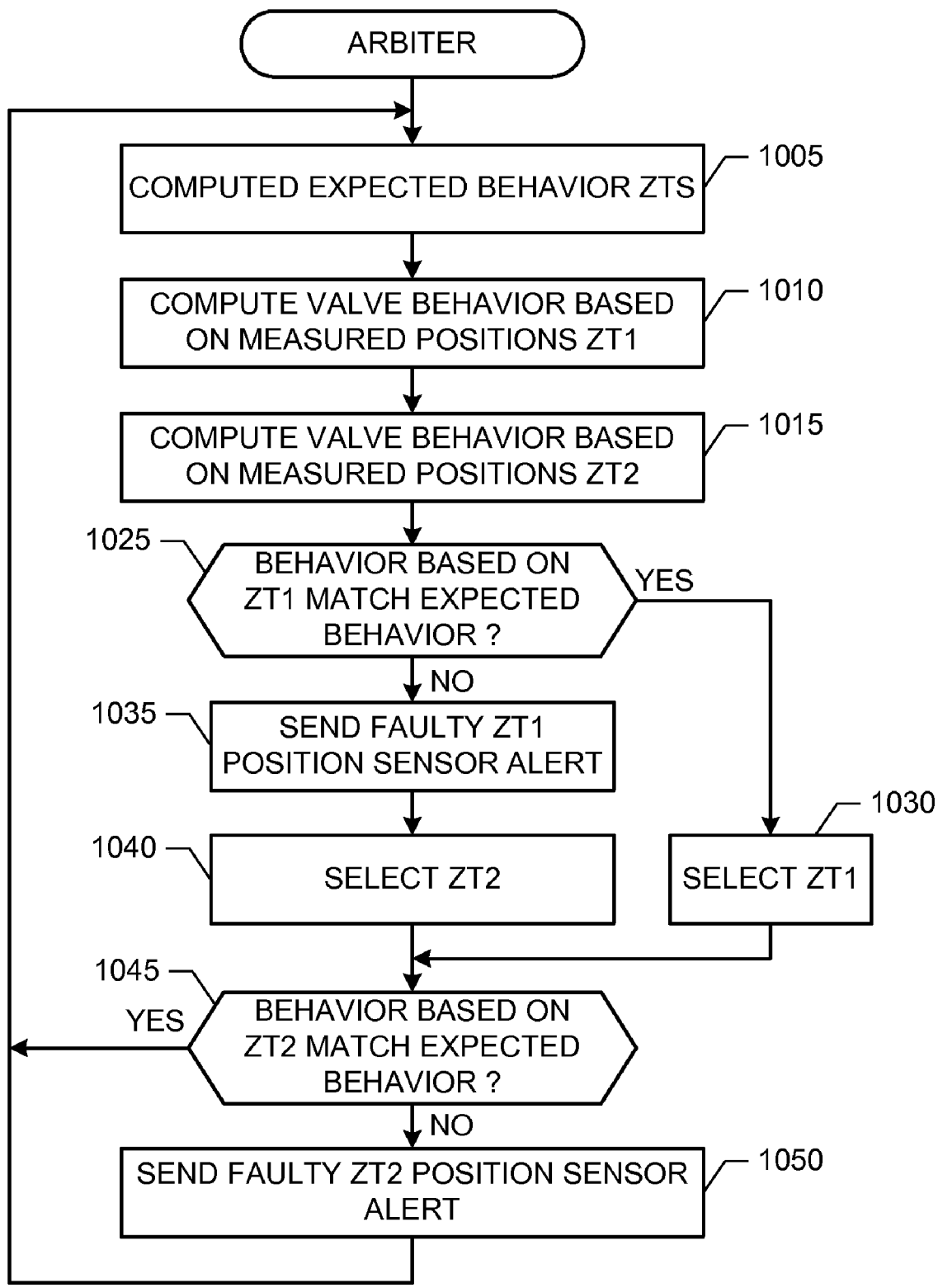

FIGS. 6 and 7 illustrates flowcharts representative of example processes that may be carried out to configure the example modeler 205 of FIGS. 2 and 3. FIGS. 8, 9 and 10 illustrates flowcharts representative of example processes that may be carried out to implement the example arbiter 150 of FIGS. 1, 2 and 4. The example processes of FIGS. 6, 7, 8, 9 and/or 10 may be carried out by a processor, a controller and/or any other suitable processing device. For example, the example processes of FIGS. 6, 7, 8, 9 and/or 10 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 11). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 6, 7, 8, 9 and/or 10 may be implemented using any combination(s) of ASIC(s), PLD(s), FPLD(s), FPGA(s) discrete logic, hardware, firmware, etc. Also, some or all of the example processes of FIGS. 6, 7, 8, 9 and/or 10 may instead be implemented manually. Further, many other methods of implementing the example operations of FIGS. 6, 7, 8, 9 and/or 10 may be employed. For example, the order of execution of the blocks may be changed, and/or one or more of the blocks described may be changed, eliminated, subdivided, or combined. Additionally, any or all of the example processes of FIGS. 6, 7, 8, 9 and/or 10 may be carried out sequentially and/or carried out in parallel by, for example, separate processing threads, processors, devices, discrete logic, circuits, etc.

The example process of FIG. 6 begins with the example modeler 205 receiving the control signal 210 from the valve position controller 215 (block 605). The example model/filter 305 computes the estimated position and/or estimated behavior ZTS based on the control signal 210, a model/filter state, and/or one or more coefficients, as described above in connection with FIGS. 2 and/or 3 (block 610).

If adaptation of the model/filter 305 is enabled (block 615), the example subtractor 315 computes differences between the estimated position ZTS and the measured positions ZT1 and ZT2 (block 620). The example updater 320 updates the coefficients based on the computed differences (block 625). Control then returns to block 605 to process the next control signal 210.

Returning to block 615, if adaptation is not enabled (block 615), control returns to block 605 to process the next control signal 210.

The example process of FIG. 7 begins with the example modeler 205 receiving measured pressures PT1 and PT2 from the pressure sensors 132 and 133, respectively (block 705). The example model/filter 305 computes the estimated position and/or estimated behavior ZTS based on the measure pressures PT1 and PT2, a model/filter state, and/or one or more coefficients, as described above in connection with FIGS. 2 and/or 3 (block 710).

If adaptation of the model/filter 305 is enabled (block 715), the example subtractor 315 computes differences between the estimated position ZTS and the measured positions ZT1 and ZT2 (block 720). The example updater 320 updates the coefficients based on the computed differences (block 725). Control then returns to block 705 to process another set of measured pressures PT1 and PT2.

Returning to block 715, if adaptation is not enabled (block 715), control returns to block 705 to process another set of measured pressures PT1 and PT2.

The example process of FIG. 8 begins with the example arbiter 150 receiving the estimated position ZTS and the measured positions ZT1 and ZT2 (block 805). The example comparator 405 computes a first difference 410 between ZT1 and ZT2, a second difference 410 between ZT1 and ZTS, and a third difference 410 between ZT2 and ZTS (block 810).

Using, for example, the example decision logic of FIG. 5, the example selector 415 selects ZT1 or ZT2 (block 815), and determines whether the model/filter 305 should be adapted (block 820). If a position sensor 130, 131 has been identified as not operating as intended (e.g., failing and/or failed) (block 825), the selector 415 issues an alert for that sensor 130, 131 (block 830). Control then returns to block 805 to process another set of positions ZTS, ZT1 and ZT2.

Returning to block 825, if no sensor 130, 131 has been identified as not operating as intended (block 825), control returns to block 805 to process another set of positions ZTS, ZT1 and ZT2.

The example process of FIG. 9 begins with the example arbiter 150 receiving a first estimated position ZTS and a first set of measured positions ZT1 and ZT2 (block 905), and receiving a second estimated position ZTS and a second set of measured positions ZT1 and ZT2 (block 910). The example comparator 405 computes a first difference $\Delta ZT1$ between the first and second ZT1 values, a second difference $\Delta ZT2$ between the first and second ZT2 values, and a third difference $\Delta ZTS$ between the first and second ZTS values (block 915).

The selector 415 compares $\Delta ZT1$ and $\Delta ZTS$ (block 920). If a difference between $\Delta ZT1$ and $\Delta ZTS$ is less than a threshold (block 920), ZT1 is selected (block 925) and control proceeds to block 940. If the difference between $\Delta ZT1$ and $\Delta ZTS$ is greater than or equal to the threshold (block 920), an alert for position sensor 130 is issued (block 930) and ZT2 is selected (block 935).

The selector 415 compares $\Delta ZT2$ and $\Delta ZTS$ (block 940). If a difference between $\Delta ZT2$ and $\Delta ZTS$ is less than a threshold (block 940), control returns to block 905 to process additional positions measurements. If the difference between $\Delta ZT2$ and $\Delta ZTS$ is greater than or equal to the threshold (block 940), an alert for position sensor 131 is issued (block 954), and control returns to block 905 to process additional position measurements.

The example process of FIG. 10 begins with the example modeler 205 computing an expected behavior ZTS based on a fast moving average and a slow moving average of the control signal 210, as described above in connection with FIG. 2 (block 1005). The comparator 405 computes a fast moving average and a slow moving average of the measured positions ZT1 (block 1010), and computes a fast moving average and a slow moving average of the measured positions ZT2 (block 1015).

The selector 415 compares the expected valve behavior based on the measured positions ZT1 to the expected behavior ZTS (block 1025). If the behaviors match (block 1025), ZT1 is selected (block 1030) and control proceeds to block 1045. If the behaviors do not match (block 1025), an alert for position sensor 130 is issued (block 1035) and ZT2 is selected (block 1040).

The selector 415 compares the expected valve behavior based on the measured positions ZT2 to the expected behavior ZTS (block 1045). If the behaviors match (block 1045), control returns to block 1005 to process additional positions measurements ZT1 and ZT2. If the behaviors do not match (block 1045), an alert for position sensor 131 is issued (block 1050), and control returns to block 1005 to process additional position measurements.

While moving averages are utilized in the illustrated example of FIG. 10, it should be understood that other methods of characterizing behavior of the valve 105 may, additionally or alternatively, be used. For example, as discussed in detail above in connection with FIG. 2, differences and/or derivatives can be used.

Figure 11:
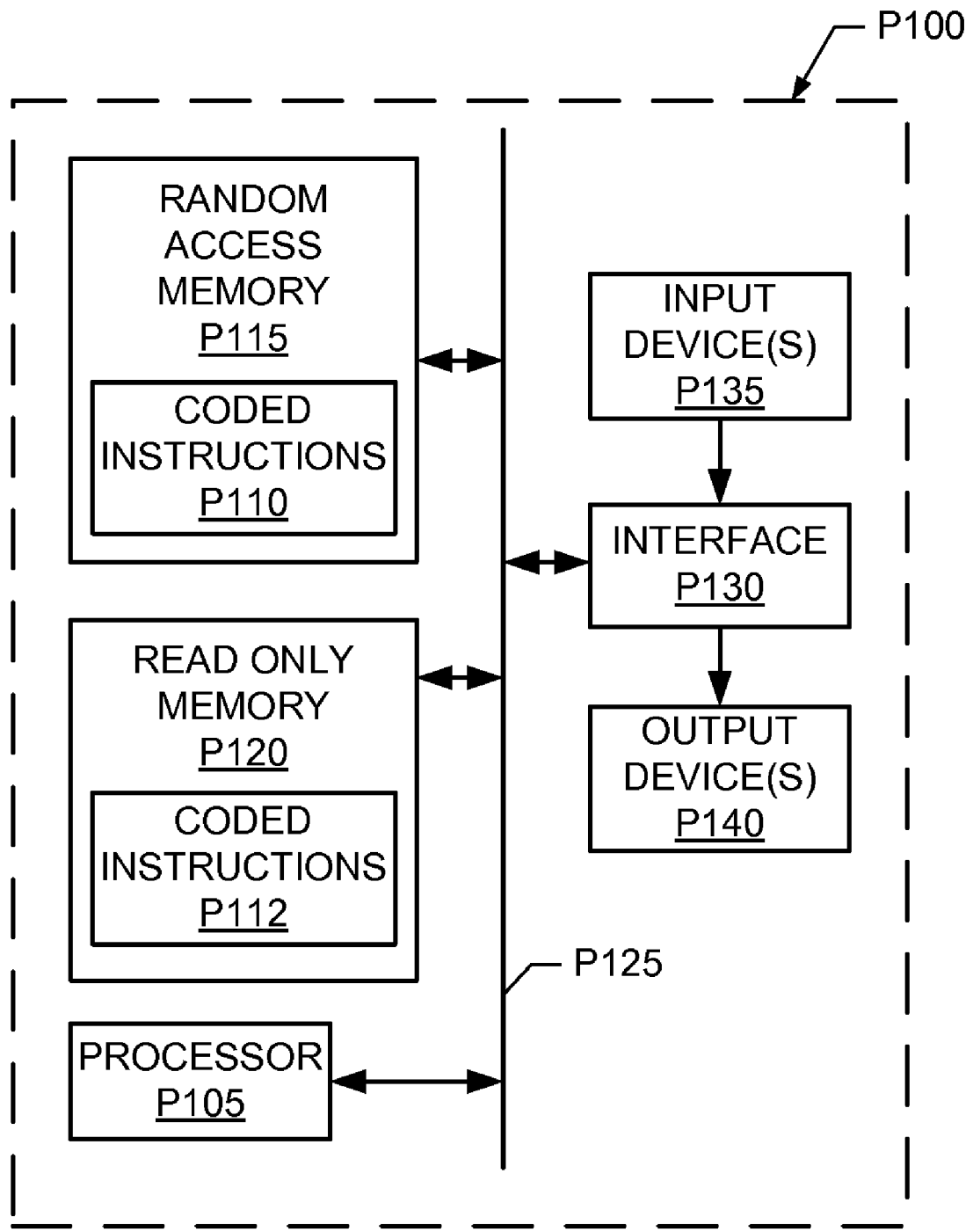
FIG. 11 is a schematic illustration of an example processor platform that may be used and/or programmed to carry out the example processes of FIGS. 6, 7, 8, 9 and/or 10, and/or, more generally, to implement the example valve positioner of FIGS. 1 and 2.

FIG. 11 is a schematic diagram of an example processor platform P100 that may be used and/or programmed to implement the example valve positioner 135 of FIG. 1. For example, the processor platform P100 can be implemented by one or more general-purpose processors, processor cores, microcontrollers, etc.

The processor platform P100 of the example of FIG. 11 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 6, 7, 8, 9 and/or 10 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device(s), and ROM may be implemented by flash memory, EPROM, EEPROM, a CD, a DVD and/or any other desired type of memory device(s). Access to the memory P115 and the memory P120 may be controlled by a memory controller (not shown). The example memory P115 may be used to state information, state data and/or coefficients for the model/filter 305 of FIG. 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input devices P135 may be used to, for example, receive the measurements ZT1, ZT2, PT1 and PT2. The example output devices P140 may be used to, for example, provide the control signal 120.

Although certain example methods, apparatus and articles of manufacture have been described herein, the scope of coverage of this patent is not limited thereto. Such example are intended to be non-limiting illustrative examples. On the contrary, this patent covers all methods, apparatus and articles of manufacture fairly falling within the scope of the appended claims either literally or under the doctrine of equivalents.

What is claimed is:

1. A method comprising:
computing a first difference between first and second values representative of a position of a valve according to a first sensor;
computing a second difference between third and fourth values representative of the position of the valve according to a second sensor different from the first sensor;
computing a third difference between first and second estimated positions of the valve;
comparing the first difference to the third difference;
comparing the second difference to the third difference; and
selecting one of the first and second sensors for use in generating a first valve control signal for the valve based on the comparison of the first difference to the third difference and the comparison of the second difference to the third difference.

2. A method as defined in claim 1, further comprising computing the first estimated position by:
receiving a first pressure measurement associated with the valve; and
receiving a second pressure measurement associated with the valve, wherein the first estimated position is computed based on the first and second pressure measurements.

3. A method as defined in claim 2, wherein the first pressure measurement is associated with a first chamber of a valve actuator, wherein the second pressure measurement is associated with a second chamber of the valve actuator, and wherein a ratio of first and second pressures in the first and second chambers controls an adjustment of the position of the valve.

4. A method as defined in claim 1, wherein the first estimated position is computed based on a second valve control signal.

5. A method as defined in claim 3, wherein the first estimated position is computed based on the second valve control signal using a model that represents the position of the valve as a function of the second valve control signal.

6. A method as defined in claim 1, further comprising:
computing a fourth difference between the first value representative of the position of the valve according to the first sensor and the third value representative of the position of the valve according to the second sensor;
computing a fifth difference between the first value representative of the position of the valve according to the first sensor and the first estimated position; and
computing a sixth difference between the third value representative of the position of the valve according to the second sensor and the first estimated position; and
selecting one of the first and second sensors based on the fourth, fifth, and sixth differences.

7. A method as defined in claim 6, further comprising selecting the first sensor when the fourth difference substantially matches the sixth difference.

8. A method as defined in claim 1, further comprising updating a model used to compute the first estimated position based on a difference between the first value and the first estimated position.

9. A method as defined in claim 1, further comprising, when the first difference is within a threshold amount of the third difference, selecting the first sensor for use in generating the first valve control signal.

10. A method as defined in claim 9, further comprising, when the first difference is outside the threshold amount of the third difference, selecting the second sensor for use in generating the first valve control signal if the second difference is within the threshold amount of the third difference.

11. An apparatus comprising:
a first sensor to measure first and second values representative of first and second positions of a valve actuator;
a second sensor to measure third and fourth values representative of third and fourth positions of the valve actuator;
a modeler to compute first and second estimated positions of the valve actuator;
a comparator to compute a first difference between the first and second values, to compute a second difference between the third and fourth values, and to compute a third difference between the first and second estimated positions of the valve actuator;
an arbiter to select one of the first and second sensors based on a comparison between the first difference and the third difference and on a comparison between the second difference and the third difference; and
a controller to generate a first valve control signal for the valve actuator based on the selected one of the first and second sensors.

12. An apparatus as defined in claim 11, further comprising:
a first pressure sensor to perform a first pressure measurement in connection with the valve actuator; and
a second pressure sensor to perform a second pressure measurement in connection with the valve actuator, wherein the modeler is to compute the first and second estimated positions based on the first and second pressure measurements.

13. An apparatus as defined in claim 11, wherein modeler is to compute the first and second estimated positions based on a second valve control signal.

14. An apparatus as defined in claim 11, wherein the modeler comprises a model that represents the position of the valve actuator as a function of a second valve control signal.

15. An apparatus as defined in claim 11, wherein the comparator is to compute a fourth difference between the first and third values, to compute a fifth difference between the first value and the first estimated position, and to compute a sixth difference between the second value and the first estimated position; and
wherein the arbiter is to select one of the first and second sensors based on the fourth, fifth and sixth differences.

16. An apparatus as defined in claim 15, wherein the arbiter is to select the first sensor when the fourth difference substantially matches the sixth difference.

17. An apparatus as defined in claim 11, wherein the modeler comprises:
a model to compute the first and second estimated positions; and
an updater to update the model based on a difference between the first value and the first estimated position.

18. An apparatus as defined in claim 11, wherein the arbiter is to select the first sensor when the first difference is within a threshold amount of the third difference.

19. A tangible computer readable storage medium comprising machine readable instructions that, when executed, cause a machine to at least:
compute a first difference between first and second values representative of a position of a valve actuator according to a first position sensor;
compute a second difference between third and fourth values representative of the position of the valve actuator according to a second position sensor;
compute a third difference between first and second estimated positions of the valve actuator;
compare the first difference to the third difference;
compare the second difference to the third difference;
select one of the first and second position sensors for use in generating a first valve control signal for the valve actuator based on the comparison of the first difference to the third difference and the comparison of the second difference to the third difference.

20. A computer readable storage medium as defined in claim 19, wherein the machine readable instructions, when executed, cause the machine to compute the first estimated position by:
receiving a first pressure measurement associated with the valve actuator; and
receiving a second pressure measurement associated with the valve actuator, wherein the first estimated position is computed based on the first and second pressure measurements.

21. A computer readable storage medium as defined in claim 19, wherein the machine readable instructions, when executed, cause the machine to compute the first estimated position based on a model that represents the position of the valve actuator as a function of a second valve control signal.

22. A computer readable storage medium as defined in claim 21, wherein the machine readable instructions, when executed, cause the machine to update the model based on a difference between the first value and the first estimated position.

23. A computer readable storage medium as defined in claim 19, wherein the machine readable instructions, when executed, cause the machine to:
compute a fourth difference between the first value representative of the first position of the valve according to the first position sensor and the third value representative of the position of the valve according to the second position sensor;
compute a fifth difference between the first value representative of the position of the valve according to the first sensor and the first estimated position;
compute a sixth difference between the third value representative of the position of the valve according to the second sensor and the first estimated position; and
select one of the first and second sensors based on the fourth, fifth, and sixth differences.

24. A computer readable storage medium as defined in claim 19, wherein the machine readable instructions, when executed, cause the machine to select the first sensor when the first difference is within a threshold amount of the third difference.

* * * * *